(12) United States Patent
Ghosh et al.

(10) Patent No.: US 9,327,237 B2
(45) Date of Patent: May 3, 2016

(54) SYSTEMS AND METHODS FOR REMOVING SULFUR DIOXIDE FROM A GAS STREAM

(71) Applicant: ALCOA INC., Pittsburgh, PA (US)

(72) Inventors: Rajat S. Ghosh, Murrysville, PA (US); John R. Smith, Pittsburgh, PA (US)

(73) Assignee: ALCOA INC., Pittsburgh, PA (US)

( * ) Notice: Subject to any disclaimer, the term of this patent is extended or adjusted under 35 U.S.C. 154(b) by 0 days.

(21) Appl. No.: 14/338,864

(22) Filed: Jul. 23, 2014

(65) Prior Publication Data

US 2016/0023162 A1 Jan. 28, 2016

(51) Int. Cl.
*B01D 53/50* (2006.01)
*B01D 53/86* (2006.01)

(52) U.S. Cl.
CPC .... *B01D 53/8609* (2013.01); *B01D 2255/2022* (2013.01); *B01D 2255/2073* (2013.01)

(58) Field of Classification Search
CPC ..... B01D 53/50; B01D 53/501; B01D 53/502
USPC ........................................ 423/243.07, 243.08
See application file for complete search history.

(56) References Cited

U.S. PATENT DOCUMENTS

| | | | |
|---|---|---|---|
| 2,021,548 A * | 11/1935 | Goodeve .............. | B01D 53/501 423/243.01 |
| 3,617,212 A | 11/1971 | Shah ............................. | 423/522 |
| 3,653,823 A | 4/1972 | Shah ........................ | 423/243.09 |
| 3,948,608 A | 4/1976 | Weir, Jr. ........................ | 422/169 |
| 3,957,464 A | 5/1976 | Teller .............................. | 95/196 |
| 3,969,482 A | 7/1976 | Teller ............................. | 423/235 |
| 4,049,399 A | 9/1977 | Teller ................................ | 55/73 |
| 4,067,703 A | 1/1978 | Dullien et al. ................... | 95/218 |
| 4,213,946 A * | 7/1980 | Furuta ................... | C01F 11/464 423/166 |
| 4,269,812 A | 5/1981 | Edwards et al. ......... | 423/243.09 |
| 4,305,737 A | 12/1981 | Laliwala ......................... | 96/259 |

(Continued)

FOREIGN PATENT DOCUMENTS

| | | | | |
|---|---|---|---|---|
| CA | 2097115 C | * | 9/1997 | ........... B01D 53/502 |
| CN | 102858426 B | * | 11/2014 | ........... B01D 53/502 |

(Continued)

OTHER PUBLICATIONS

Bete, "HF Mitigation by Water Sprays," https://web.archive.org/web/20111012162854/http://bete.com/pdfs/BETE_HF_mitigation.pdf, Oct. 12, 2011 (Dec. 10, 2011).

(Continued)

*Primary Examiner* — Timothy Vanoy
(74) *Attorney, Agent, or Firm* — Greenberg Traurig, LLP

(57) ABSTRACT

Methods for removing sulfur dioxide front a gas stream are disclosed. A method may include passing a gas stream comprising $SO_2$ through a gas scrubbing apparatus. A scrubbing liquor comprising hydroxide ions and at least one oxidation catalyst may be flowed into the gas scrubbing apparatus, thereby contacting the gas stream with the scrubbing liquor. In response to the contacting, at least 90 wt. % of the sulfur dioxide may be removed from the gas stream. Concomitant to the contacting, at least some of the sulfur dioxide may react with at least some of the hydroxide ions, thereby forming sulfite ions in the scrubbing liquor. Some of the sulfite ions may be oxidized, via the oxidation catalyst, thereby forming sulfate ions in the scrubbing liquor. A used scrubbing liquor may be discharged from the scrubbing apparatus.

20 Claims, 8 Drawing Sheets

(56) References Cited

U.S. PATENT DOCUMENTS

| | | | | |
|---|---|---|---|---|
| 4,343,771 A | 8/1982 | Edwards et al. | | 422/168 |
| 4,374,813 A | 2/1983 | Chen et al. | | 423/243.08 |
| 4,462,969 A | 7/1984 | Wilhelm | | 423/242 |
| 4,865,817 A | 9/1989 | Burgess et al. | | 422/168 |
| 4,976,937 A | 12/1990 | Lee | | 423/243.09 |
| 5,039,315 A | 8/1991 | Liao et al. | | 95/214 |
| 5,266,285 A | 11/1993 | Glancy et al. | | 423/243.09 |
| 5,306,475 A * | 4/1994 | Fichtel | | B01D 53/34 423/210 |
| 5,403,568 A | 4/1995 | Stowe, Jr. | | 423/243.08 |
| 5,439,509 A | 8/1995 | Spink et al. | | 95/166 |
| 5,486,341 A | 1/1996 | Bresowar | | 423/243.01 |
| 5,582,807 A | 12/1996 | Liao et al. | | 423/210 |
| 5,645,807 A * | 7/1997 | College | | B01D 53/501 423/243.03 |
| 5,662,721 A | 9/1997 | Bresowar | | 55/257 |
| 5,759,233 A | 6/1998 | Schwab | | 95/8 |
| 6,063,352 A | 5/2000 | Risse et al. | | 423/243.06 |
| 6,399,030 B1 | 6/2002 | Nolan | | 422/172 |
| 6,562,304 B1 | 5/2003 | Mizrahi | | 422/171 |
| 6,964,699 B1 | 11/2005 | Carns et al. | | 96/361 |
| 6,984,368 B2 | 1/2006 | Hajjatie et al. | | 423/514 |
| 7,645,430 B2 | 1/2010 | Ghosh et al. | | 423/210 |
| 7,906,089 B2 | 3/2011 | Ghosh et al. | | 423/210 |
| 7,931,737 B2 | 4/2011 | Dando | | 59/131 |
| 8,137,649 B2 | 3/2012 | Ghosh et al. | | 423/210 |
| 8,894,748 B2 | 11/2014 | Ghosh et al. | | 95/230 |
| 2002/0110511 A1 | 8/2002 | Klingspor et al. | | 423/243.08 |
| 2004/0079235 A1 | 4/2004 | Vrotsos | | 96/299 |
| 2008/0050298 A1 | 2/2008 | Meyden et al. | | 423/240 |
| 2009/0188782 A1 | 7/2009 | Genuario et al. | | 204/157.3 |
| 2010/0229725 A1 | 9/2010 | Farsad et al. | | 95/236 |
| 2015/0033946 A1 | 2/2015 | Ghosh et al. | | 96/355 |

FOREIGN PATENT DOCUMENTS

| | | | | |
|---|---|---|---|---|
| EP | 0613713 | | 9/1994 | 53/34 |
| GB | 2267702 A * | | 12/1993 | B01D 53/502 |
| WO | WO 8809203 A2 * | | 12/1988 | B01D 53/34 |
| WO | WO 2006/104304 | | 10/2006 | 53/78 |
| WO | WO2007/096492 | | 8/2007 | |

OTHER PUBLICATIONS

Chang et al., $SO_2$ Removal by Limestone Dual Alkali, Environmental Progress, vol. 3, No. 4, pp. 267-274, (1984).

Lunt et al., Adaptation of Dilute Mode Lime Dual Alkali Scrubbing at Stillwater Mining Company PGM Smelter, Hydrometallurgy 2003—Fifth International Conference, vol. 2, pp. 1729-1739, (2003).

Medellin et al., Removal of $SO_2$ and $NO_x$ from Simulated Flue Gases by Alkalized Alumina in a Radial Flow Fixed Bed, Ind. Eng. Chem. Process Des. Dev., vol. 17, No. 4, (1978).

International Search Report and Written Opinion from co-owned International Application No. PCT/US2013/055580, mailed Dec. 6, 2013.

* cited by examiner

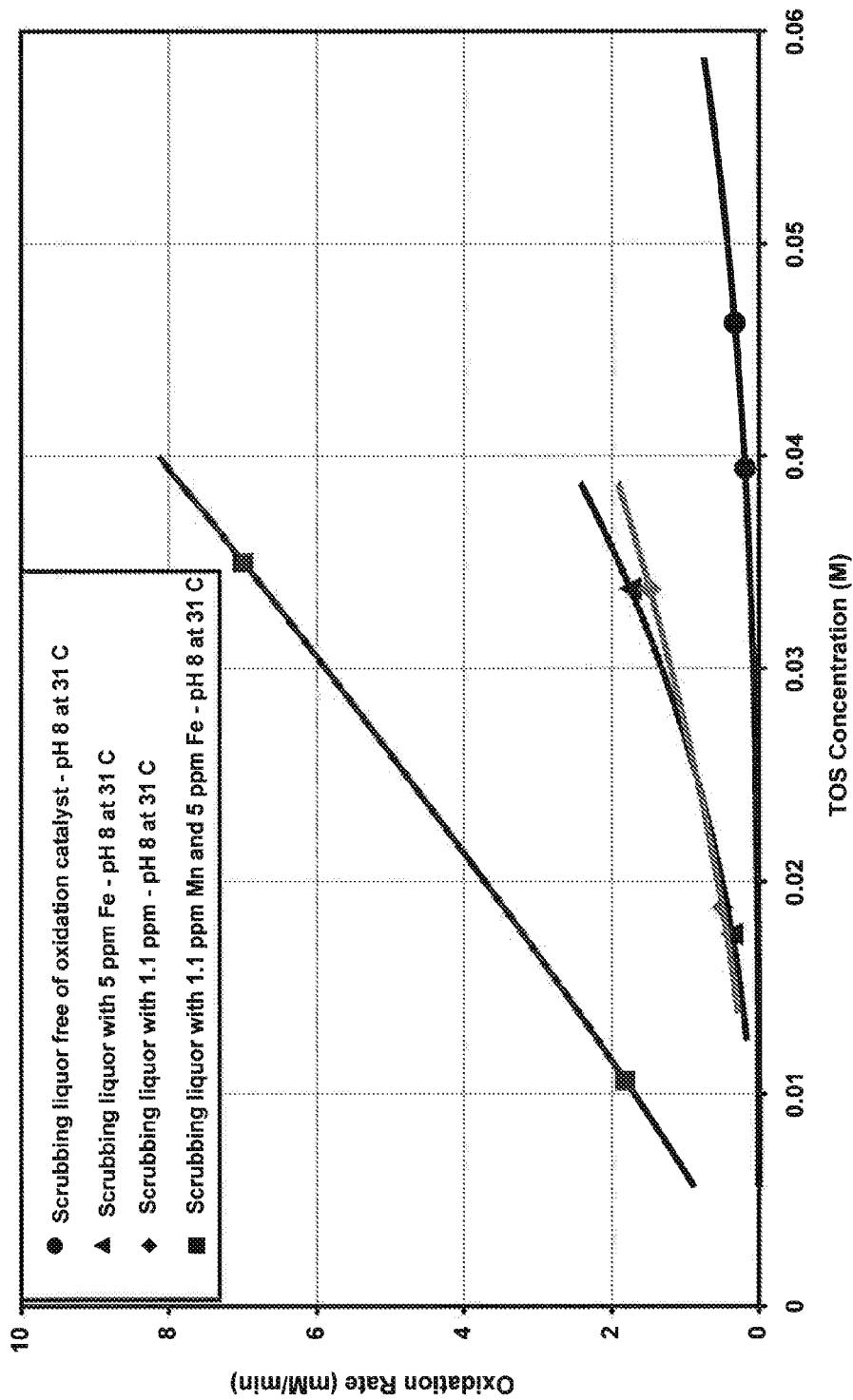

SYSTEMS AND METHODS FOR REMOVING SULFUR DIOXIDE FROM A GAS STREAM

BACKGROUND

Gases containing pollutants, such as sulfur dioxide, are produced in many industrial processes. For example, industrial boilers, calciners, smelters, and bake furnaces, to name a few, may produce gas streams containing sulfur dioxide. The United States Environmental Protection Agency ("EPA") regulates sulfur dioxide air pollution in the United States. More specifically, the EPA sets air quality standards regarding sulfur dioxide (40 CFR §§50, 53, and 58). Compliance with these (and other) EPA air quality standards may require removal of at least some sulfur dioxide from a gas stream.

SUMMARY OF THE DISCLOSURE

Reference will now be made in detail to the accompanying drawings, which at least assist in illustrating various pertinent embodiments of the new technology provided for by the present disclosure. Referring now to FIGS. 1-8, systems and methods for removing sulfur dioxide from a gas stream are illustrated. Referring now to FIG. 1, one embodiment of a system (1) for removing sulfur dioxide from a gas stream is illustrated. The illustrated system (1) includes a scrubbing apparatus (100) for treating a sulfur dioxide-containing gas stream (110). The scrubbing apparatus (100) is adapted to contact the gas stream (110) with a scrubbing liquor (160) comprising an oxidation catalyst (164) and hydroxide ions. In response to this contacting, at least 90 wt. % of the sulfur dioxide of the gas stream (110) may be removed, thereby creating a treated gas stream (120). Concomitant to the contacting at least some of the sulfur dioxide may react with the hydroxide ions to form sulfite ions. At least some of these sulfite ions may then be oxidized, via the oxidation catalyst (164), to sulfate ions, thereby creating a used scrubbing liquor (130). As described below, the oxidation catalyst (164) may facilitate the reaction of sulfite ions to sulfate ions, thus a high ratio of sulfate ions to sulfite ions may be formed in the used scrubbing liquor (130). The used scrubbing liquor (130) may be discharged from the scrubbing apparatus (100) to a recycle vessel (200). The recycle vessel (200) may recirculate a portion of the used scrubbing liquor (130) back to the scrubbing apparatus (100) via a recycled scrubbing liquor (220). The recycle vessel may also discharge a recycle effluent (230) comprising at least some of the used scrubbing liquor (130) to a reaction vessel (300).

Still referring to FIG. 1, inside the reaction vessel (300), the recycle effluent (230) comprising at least some of the used scrubbing liquor (130) may be contacted with lime (310). As a result of this contact, at least some of the sulfite ions and some of the sulfate ions may react with the lime (310) to form precipitated solids and regenerated hydroxide ions. The precipitated solids may include solid gypsum particles and non-gypsum solids. As described below, the precipitated solids may comprise at least 85% gypsum due, at least in part, to the presence of the oxidation catalyst (164) in the scrubbing liquor (160). A reaction slurry (320) including at least some of the precipitated solids and regenerated hydroxide ions may be discharged from the reaction vessel (300) to a thickener (400).

Inside the thickener (400), at least some of the precipitated solids may be settled from the reaction slurry (320), thereby forming a liquid-rich layer above a solids-rich layer inside the thickener (400). The liquid-rich layer may include a majority of the regenerated hydroxide ions. The solids-rich layer may include a majority of the precipitated solids. At least some of the liquid-rich layer may be decanted, via a thickener effluent (420), from the thickener (400) to a scrubber feed vessel (600). A seed crystal slurry (440) comprising at least some of the solids-rich layer may be discharged from the thickener (400) to the reaction vessel (300). A solids recycle stream (450) comprising at least some of the solids-rich layer may be discharged from the thickener (400) to the scrubber feed vessel (600). A filter feed slurry (430) comprising at least some of the solids-rich layer may be discharged from the thickener (400) to a filter (500).

Still referring to FIG. 1, the filter (500) may separate the filter feed slurry (430) into a filter effluent (530) and a wetcake material (520). The wetcake material (520) may comprise a solids portion and a liquid portion. The solids portion may include at least some of the solid gypsum particles formed in the reaction vessel (300). As described below, the solids portion may comprise at least 85% gypsum due at least in part to the high ratio of sulfate ions to sulfite ions achieved via the oxidation catalyst (164). The filter effluent (530) may include at least some of the regenerated hydroxide ions formed in the reaction vessel (300). The filter effluent (530) may be discharged from the filter (500) to the scrubber feed vessel (600).

The scrubber feed vessel (600) may mix the thickener effluent (420) and the filter effluent (530) together with the solids recycle stream (450) to form a regenerated scrubbing liquor (620). The regenerated scrubbing liquor (620) may include at least some of the precipitated solids of the solids recycle stream (450). The solids recycle stream (450) may then be mixed with the recycled scrubbing liquor (220) to form the scrubbing liquor (160). Thus, at least some of the precipitated solids may be flowed into the scrubber (100).

Referring now to FIG. 2, one embodiment of a scrubbing apparatus (100) is shown. As used herein, a "gas scrubbing apparatus" and the like means an apparatus for removing at least some $SO_2$ from a gas stream. In the illustrated embodiment, the scrubbing apparatus comprises a housing (102) having, a gas inlet (190) for receiving the gas stream (110) containing sulfur dioxide (112) and oxygen (114). The scrubbing apparatus (100) also includes a gas outlet (194) for discharging a treated gas stream (120). The housing (102) may include a liquid inlet (142) interconnected to a scrubbing liquor manifold (180). The scrubbing liquor manifold (180) may comprise one or more scrubbing liquor nozzles (182) adapted to spray liquid droplets of the scrubbing liquor (160) into the housing (102). The housing (102) may also comprise one or more demisters (148) configured to capture the liquid droplets and channel them into a liquid outlet (144). The housing (102) may further include a cooling spray manifold (170) comprising cooling spray nozzles (172) for spraying a cooling water mist into the housing (102).

As described above, the gas stream (110) contains sulfur dioxide (112) when it enters the scrubbing apparatus (100) via the gas inlet (190). In one embodiment, the $SO_2$ concentration in the gas stream is from 1 to 400 ppm (parts per million) when it enters the gas inlet. In another embodiment, the $SO_2$ concentration in the gas stream is from 1 to 350 ppm when it enters the gas inlet. In still another embodiment, the $SO_2$ concentration in the gas stream is from 1 to 300 ppm when it enters the gas inlet. In another embodiment, the $SO_2$ concentration in the gas stream is from 1 to 250 ppm when it enters the gas inlet. In still another embodiment, the $SO_2$ concentration in the gas stream is from 1 to 200 ppm when it enters the gas inlet.

Still referring to FIG. 2, the scrubbing liquor (160) enters the scrubbing apparatus (100) via liquid inlet (142). As used herein, a "scrubbing liquor" and the like means any liquid adapted to remove $SO_2$, via a gas scrubbing apparatus, from a waste gas stream via interaction therewith. In one embodiment, the scrubbing liquor is an aqueous sodium-based scrubbing liquor adapted to be regenerated via dilute dual mode alkali methodology. As used herein, "dilute dual mode alkali methodology" and the like means the method of removing $SO_2$ from a gas stream wherein the $SO_2$ is absorbed by an alkaline scrubbing liquor, followed by regeneration of the scrubbing liquor via reaction with lime, wherein the active sodium (Na) concentration of the scrubbing liquor is not greater than 0.15M. As used herein, "active Na concentration" and the like means $2 \times [SO_3^{-2}$ ions$] + [HSO_3^{-1}$ ions$]$. When it enters the liquid inlet (142), the scrubbing liquor (160) may comprise hydroxide ions (162), an oxidation catalyst (164), regenerated hydroxide ions (322), water (605) and precipitated solids (324) including solid gypsum particles (326) and non-gypsum solids (328). As used herein, "hydroxide ions" and the like means $OH^{-1}$ ions. As described above, the scrubbing liquor nozzles (182) may spray liquid droplets of the scrubbing liquor (160) into the housing (102). The gas stream (110) comprising sulfur dioxide ($SO_2$) (112) and oxygen ($O_2$) (114) may be passed through the housing (102) thereby contacting at least some of the $SO_2$ (112) with the liquid droplets. Concomitant to the contacting, at least some of the $SO_2$ (112) may be reacted, in the housing (102), with at least some of the hydroxide ions (162) to form sulfite ions (132) according to the following reactions:

$$SO_2 + 2OH^{-1} \rightarrow SO_3^{-2} + H_2O$$

$$SO_2 + SO_3^{-2} + H_2O \rightarrow 2HSO_3^{-1}$$

Once formed, the sulfite ions (132) may be converted, in the housing (102), to sulfate ions (134) via the oxidation catalyst (164) according to the following reactions:

$$SO_3^{-2} + 0.5O^2 \rightarrow SO_4^{-2}$$

$$HSO_3^{-1} + 0.5O^2 + OH^{-1} \rightarrow SO_4^{-2} + H_2O$$

As used herein, "sulfite ions" and the like means $SO_3^{-2}$ and/or $HSO_3^{-1}$ ions. As used herein, "sulfate ions" and the like means $SO_4^{-2}$ ions. As used herein, an "oxidation catalyst" and the like means a material that increases the rate of oxidation of sulfite ions ($SO_3^{-2}$ and/or $HSO_3^{-1}$) to sulfate ions ($SO_4^{-2}$). Thus, the presence of the oxidation catalyst (164) in the scrubbing liquor (160) may facilitate a high ratio of sulfate ions (134) to sulfite ions (132) in the used scrubbing liquor (130).

The oxidation catalyst (164) may be water soluble. For example, the oxidation catalyst (164) may include water soluble forms of one or more transition metals, for example one or more salts of a transition metal. The (164) oxidation catalyst may be at least partially dissolved in the scrubbing liquor (160). In one embodiment, the oxidation catalyst comprises iron in the plus two oxidation state ($Fe^{2+}$). For example, the oxidation catalyst may comprise $FeSO_4 \cdot 7H_2O$. In another embodiment, the oxidation catalyst may comprise manganese (Mn). For example, the oxidation catalyst may comprise $KMnO_4$. In one approach, the oxidation catalyst comprises both Fe and Mn. For example, in one embodiment, the oxidation catalyst comprises both Fe and Mn in a ratio of approximately 1:5 (Fe:Mn). In another embodiment, the oxidation catalyst comprises both Fe and Mn in a ratio of approximately 2:5 (Fe:Mn). In yet another embodiment, the oxidation catalyst comprises both Fe and Mn in a ratio of approximately 3:5 (Fe:Mn). In one aspect, the catalyst comprises one or more of iron, manganese, chromium, cobalt, copper, iron, manganese, nickel and vanadium. In one embodiment, the scrubbing liquor may comprise at least 2 ppm (parts per million) of the oxidation catalyst. In another embodiment, the scrubbing liquor may comprise at least 3 ppm of the oxidation catalyst. In one embodiment, the scrubbing liquor may comprise at least 5 ppm of the oxidation catalyst. In another embodiment, the scrubbing liquor may comprise at least 7 ppm of the oxidation catalyst. In one embodiment, the scrubbing liquor may comprise at least 10 ppm of the oxidation catalyst. In another embodiment, the scrubbing liquor may comprise not greater than 100 ppm of the oxidation catalyst. In yet another embodiment, the scrubbing liquor may comprise not greater than 80 ppm of the oxidation catalyst. In another embodiment, the scrubbing liquor may comprise not greater than 60 ppm of the oxidation catalyst. In yet another embodiment, the scrubbing liquor may comprise not greater than 50 ppm of the oxidation catalyst. In another embodiment, the scrubbing liquor may comprise not greater than 40 ppm of the oxidation catalyst. In yet another embodiment, the scrubbing liquor may comprise not greater than 30 ppm of the oxidation catalyst. In another embodiment, the scrubbing liquor may comprise not greater than 20 ppm of the oxidation catalyst. In yet another embodiment, the scrubbing liquor may comprise not greater than 15 ppm of the oxidation catalyst.

As described above, the oxidation catalyst (164) increases the rate of oxidation of sulfite ions (132) to sulfate ions (134) in the housing (102). Therefore, the oxidation catalyst (164) may facilitate the formation of a high ratio of sulfate ions (134) to sulfite ions (132) in the used scrubbing liquor (130). In one embodiment, the sulfate ions (134) and the sulfite ions (132) are present in the used scrubbing liquor (130) in a ratio of at least 19:1 (sulfate ions:sulfite ions). In another embodiment, the sulfate ions (134) and the sulfite ions (132) are present in the used scrubbing liquor (130) in a ratio of at least 24:1 (sulfate ions:sulfite ions). In one embodiment, the sulfate ions (134) and the sulfite ions (132) are present in the used scrubbing liquor (130) in a ratio of at least 97:3 (sulfate ions:sulfite ions). In another embodiment, the sulfate ions (134) and the sulfite ions (132) are present in the used scrubbing liquor (130) in a ratio of at least 49:1 (sulfate ions:sulfite ions). In one embodiment, the sulfate ions (134) and the sulfite ions (132) are present in the used scrubbing liquor (130) in a ratio of at least 99:1 (sulfate ions:sulfite ions). In another embodiment, the sulfate ions (134) and the sulfite ions (132) are present in the used scrubbing liquor (130) in a ratio of at least 200:1 (sulfate ions:sulfite ions). In one embodiment, the sulfate ions (134) and the sulfite ions (132) are present in the used scrubbing liquor (130) in a ratio of at least 500:1 (sulfate ions:sulfite ions).

As described above, the scrubbing liquor (160) sprayed into the housing 102 may contain precipitated solids (324). The sprayed precipitated solids (324) may enhance the removal efficiency of the sulfur dioxide from the gas stream (110). In one approach, the scrubbing liquor (160) includes from 0.1 to 5 wt. % precipitated solids (324). In one embodiment, the scrubbing liquor (160) includes not greater than 5.0 wt. % precipitated solids (324). In another embodiment, the scrubbing liquor (160) includes not greater than 4.5 wt. % precipitated solids (324). In yet another embodiment, the scrubbing liquor (160) includes not greater than 4.0 wt. % precipitated solids (324). In another embodiment, the scrubbing liquor (160) includes not greater than 3.5 wt. % precipitated solids (324). In yet another embodiment, the scrubbing liquor (160) includes not greater than 3.0 wt. % precipitated solids (324). In another embodiment, the scrubbing liquor (160) includes at least 0.1 wt. % precipitated solids (324). In another embodiment, the scrubbing liquor (160) includes at least 0.5 wt. % precipitated solids (324). In yet another embodiment, the scrubbing liquor (160) includes at least 1.0 wt. % precipitated solids (324). In another embodiment, the scrubbing liquor (160) includes at least 1.5 wt. % precipitated solids (324). In yet another embodiment, the scrubbing liquor (160) includes at least 2.0 wt. % precipitated solids (324).

Still referring to FIG. 2, cooling water (150) and compressed air (152) may be directed, via the cooling spray manifold (170), to the cooling spray nozzles (172). In the illustrated embodiment, the cooling spray nozzles (172) are air atomizing spray nozzles. Thus, the cooling spray nozzles (127) may mix the compressed air (152) with the cooling water (150) to produce a fine cooling mist in the housing (120). While the illustrated embodiment employs air atomizing spray nozzles (172), in another embodiment, the cooling spray nozzles are nozzles (e.g., misting nozzles) which do not require compressed air. In still another embodiment, the scrubbing apparatus is free of a cooling spray manifold and cooling spray nozzles.

The demister (148) may collect the droplets formed by the cooling spray nozzles (172). The demister (148) may also collect the droplets and precipitated solids (324) sprayed by the scrubbing liquor nozzles (182). The droplets and precipitated solids (324) collected by the demister (148) may be channeled through the liquid outlet (144) and discharged as used scrubbing liquor (130). The used scrubbing liquor (130) may comprise sulfite ions (132), sulfate ions (134), oxidation catalyst (164), water (605), and precipitated solids (324) including solid gypsum particles (326) and non-gypsum solids (328).

Referring now to FIG. 3, one embodiment of a recycle vessel (200) is shown. As used herein, a "vessel" and the like means a container having at least one inlet and at least one outlet and adapted to contain gases, liquids, solids and combinations thereof. Oxidation catalyst (164) may be added to the recycle vessel (200) to replenish any oxidation catalyst inadvertently removed from the system (1) via, for example, the wetcake material (520). The recycle vessel (300) may receive the used scrubbing liquor (130). The recycle vessel (200) may discharge the recycled scrubbing liquor (220) to a mixing zone (240). The recycled scrubbing liquor (220) comprising a portion of the used scrubbing liquor (130) may be mixed with the regenerated scrubbing liquor (620) in the mixing zone (240), thereby forming the scrubbing liquor (160). The scrubbing liquor (160) may be discharged from the mixing zone (240) to the scrubbing apparatus. As used herein, a "mixing zone" and the like means a zone for mixing at least two liquid streams together. In one embodiment, the mixing zone may be in the form of a vessel. In another embodiment, the mixing zone may be in the form of one or more pipe components (e.g., a pipe "T"). The recycle vessel (200) may discharge the recycle effluent (230) comprising at least some of the used scrubbing liquor (130) to a reaction vessel (300).

Referring now to FIG. 4, one embodiment of a reaction vessel (300) is shown. The reaction vessel (300) may receive the recycle effluent (230) including the sulfite ions (132) and the sulfate ions (134). The reaction vessel (300) may receive lime (310) from, for example a lime slaking vessel. As used herein, "lime" and the like means a material comprising at least one of $CaCO_3$, $Ca(OH)_2$, and $CaO$, and combinations thereof. Inside the reaction vessel (300), the recycle effluent (230) may be contacted with the lime (310). As a result of this contact, at least some of the sulfate ions (134) may react with the lime to form solid gypsum particles (326) and regenerated hydroxide ions (322) according to the following precipitation reaction:

$$SO_4^{-2} + Ca(OH)_2 + 2H_2O \rightarrow 2OH^{-1} + CaSO_4 \cdot 2H_2O(S)$$

Concomitantly, at least some of the sulfite ions (132) may react with the lime (310) to form non-gypsum solids (328) according to the following precipitation reaction:

$$SO_3^{-2} + Ca(OH)_2 + 0.5H_2O \rightarrow 2OH^{-1} + CaSO_3 \cdot 0.5H_2O \text{ (S)}$$

Non-gypsum solids (328) may also be formed via reaction between $CO_2$ (e.g., $CO_2$ dissolved in the recycle effluent) and lime (310) according the following precipitation reaction:

$$CO_2 + Ca(OH)_2 \rightarrow H_2O + CaCO_3(S)$$

Thus, precipitated solids (324) comprising solid gypsum particles (326) and non-gypsum solids (328) may be formed in the reaction vessel (300). As used herein, "precipitated solids" and the like means solid particles formed in a liquid via one or more precipitation reactions. As used herein, "solid particles" and the like means a piece of solid material. Solid particles may be comprised of one or more kinds of material. A solid particle may be crystalline and/or amorphous. A solid particle may be comprised of one more smaller solid particles. As used herein, a "solid gypsum particle" and the like means a solid particle comprised of gypsum (i.e., $CaCO_4 \cdot 2H_2O$). As used herein, "non-gypsum solids" and the like means solid material which is free of gypsum. Non-gypsum solids may include particles comprised of, for example, $CaCO_3$ and/or $CaSO_3 \cdot 0.5H_2O$. As used herein, "regenerated hydroxide ions" and the like means hydroxide ions that have been regenerated via reaction of sulfate ions with lime. Thus, the reaction slurry (320) including the regenerated hydroxide ions (322), water (605) and precipitated solids (324) comprising solid gypsum particles (326) and non-gypsum solids (328) may be formed in the reaction vessel (300). As used herein, a "slurry" and the like means a mixture of solid particles and a liquid, wherein the solid particles are in suspension in the liquid. As used herein, a "reaction slurry" and the like means a slurry formed as a result of a reaction, such as, for example, a precipitation reaction.

As described above, at least some of the lime may be consumed via the precipitation reactions in the reaction vessel. In one embodiment, a lime utilization efficiency (i.e., the amount of lime consumed in the reaction vessel via the above-described precipitation reactions divided by the amount of lime added to the reaction vessel) of at least 85% is achieved in the reaction vessel. In another embodiment, a lime utilization efficiency of at least 87% is achieved in the reaction vessel. In yet another embodiment, a lime utilization efficiency of at least 89% is achieved in the reaction vessel. In another embodiment, a lime utilization efficiency of at least 91% is achieved in the reaction vessel. In yet another embodiment, a lime utilization efficiency of at least 93% is achieved in the reaction vessel. In another embodiment, a lime utilization efficiency of at least 95% is achieved in the reaction vessel. In yet another embodiment, a lime utilization efficiency of at least 97% is achieved in the reaction vessel.

As described above, the presence of the oxidation catalyst (164) in the scrubbing liquor (160) may facilitate a high ratio of sulfate ions (134) to sulfite ions (132) in the used scrubbing liquor. Therefore, when the sulfate and sulfite ions (134, 132) are precipitated out of the used scrubbing liquor (130) to form the precipitated solids (324), then solid gypsum particles (326) (i.e., the product of the sulfate ion precipitation reaction) may be preferentially formed over non-gypsum particles (328) (e.g., the product of the sulfite ion precipitation reactions). Thus the precipitated solids (324) may comprise a high concentration of solid gypsum particles (326), due at least in part to the presence of the oxidation catalyst (164) in the scrubbing liquor (160). In one embodiment, the precipitated solids (324) may comprise at least 85 wt. % solid gypsum particles (326). In another embodiment, the precipitated solids (324) may comprise at least 87 wt. % solid gypsum particles (326). In still another embodiment, the precipitated solids (324) may comprise at least 89 wt. % solid gypsum particles (326). In another embodiment, the precipitated solids (324) may comprise at least 91 wt. % solid gypsum particles (326). In still another embodiment, the precipitated solids (324) may comprise at least 93 wt. % solid gypsum particles (326). In another embodiment, the precipitated solids (324) may comprise at least 95 wt. % solid gypsum particles (326).

Referring now to FIGS. 4-5, The reaction slurry (320) including the precipitated solids (324) may be discharged to the thickener (400). At least some of the precipitated solids (324) may be recirculated back to the reaction vessel (300) from the thickener (400) via the seed crystal slurry (440). As used herein, a "seed crystal slurry" and the like means a slurry which contains solid particles for promoting the formation of crystals. In this regard, a seed crystal slurry may promote the formation of solid particles during a precipitation reaction. Thus, the precipitated solids (324) of the seed crystal slurry (404) may promote the formation of solid gypsum particles (326) and non-gypsum solids (328) in the reaction vessel (300), in accordance with the above precipitation reactions.

Referring now to FIG. 5, one embodiment of a thickener (400) is shown. As used herein, a "thickener" and the like means a vessel for separating at least some of the solid particles of a slurry from the liquid of the slurry. In one embodiment, a thickener may use gravity to separate at least some of the solid particles from the liquid. In another embodiment, a thickener may use centrifugal force to separate at least some of the solid particles from the liquid. As described above, the thickener (400) may receive the reaction slurry (320) from the reaction vessel (300). Inside the thickener (400), at least some of the precipitated solids (324) may be settled from the reaction slurry (320), thereby forming a liquid-rich layer (402) above a solids-rich layer (404) inside the thickener (400). The liquid-rich layer (402) may include water (605) and most of the regenerated hydroxide ions (322). The solids-rich layer (404) may include water (605) and most of the precipitated solids (324). At least some of the liquid-rich layer (402) may be decanted, via the thickener effluent (420), from the thickener (400) to a scrubber feed vessel (600). As described above, at least some of the solids-rich layer (404) may be transferred, via the seed crystal slurry (440) to the reaction vessel (300). At least some of the solids-rich layer (404) may be transferred, via the solids recycle stream (450) to the scrubber feed vessel (600). At least some of the solids-rich layer (404) may be transferred, via the filter feed slurry (430) to a filter (500). The density of the seed crystal slurry (440) may be monitored via a seed crystal density meter (442).

Referring now to FIG. 6, one embodiment of a filter (500) is shown. The filter (500) may separate the filter feed slurry (430) into the filter effluent (530) and the wetcake material (520). The filter effluent (530) may include water (650) and at least some of the regenerated hydroxide ions (322). The filter effluent (530) may be discharged from the filter (500) to the scrubber feed vessel (600). The wetcake material (520) may comprise a solids portion (522) and a liquid portion (524). The solids portion (522) comprises at least some of the precipitated solids (324). As described above, the precipitated solids (324) may comprise a high concentration of solid gypsum particles (326), due at least in part to the presence of the oxidation catalyst (164) in the scrubbing liquor (160). In one embodiment, the solids portion (522) comprises at least 85 wt. % gypsum particles. In another embodiment, the solids portion (522) comprises at least 87 wt. % gypsum particles. In still another embodiment, the solids portion (522) comprises at least 89 wt. % gypsum particles. In another embodiment, the solids portion (522) comprises at least 91 wt. % gypsum particles. In still another embodiment, the solids portion (522) comprises at least 93 wt. % gypsum particles. In another embodiment, the solids portion (522) comprises at least 95 wt. % gypsum particles.

Referring now to FIG. 7, one embodiment of a scrubber feed vessel (600) is shown. The scrubber feed. The scrubber feed vessel (600) may mix the thickener effluent (420) and the filter effluent (530) together with the solids recycle stream (450) to form the regenerated scrubbing liquor (620). Hydroxide ions (162) may be added to the scrubber feed vessel (600) via a hydroxide ion stream (610). While in the illustrated embodiment, the hydroxide stream (610) enters the scrubber feed vessel (600), in other embodiments a hydroxide stream may enter at least one of: the scrubbing apparatus (100), the recycle vessel (200), the reaction vessel (300), the thickener (400), the filter (500), and the scrubber feed vessel (600). In one embodiment, the hydroxide stream (1610) comprises sodium hydroxide (NaOH).

Water (605) may be added to the scrubber feed vessel (600) via a make-up water stream (630). While in the illustrated embodiment, the make-up water stream (630) enters the scrubber feed vessel (600), in other embodiments a make-up water stream may enter at least one of: the scrubbing apparatus (100), the recycle vessel (200), the reaction vessel (300), the thickener (400), the filter (500), and the scrubber feed vessel (600). In one embodiment, the make-up water stream (630) may comprise water that contains not greater than 100 ppm (parts per million) chlorides. In another embodiment, the make-up water stream (630) may comprise water that contains not greater than 90 ppm chlorides. In yet another embodiment, the make-up water stream (630) may comprise water that contains not greater than 80 ppm chlorides. In another embodiment, the make-up water stream (630) may comprise water that contains not greater than 70 ppm chlorides. In yet another embodiment, the make-up water stream (630) may comprise water that contains not greater than 60 ppm chlorides. In another embodiment, the make-up water stream (630) may comprise water that contains not greater than 50 ppm chlorides. In yet another embodiment, the make-up water stream (630) may comprise water that contains not greater than 40 ppm chlorides. In another embodiment, the make-up water stream (630) may comprise water that contains not greater than 30 ppm chlorides. In yet another embodiment, the make-up water stream (630) may comprise water that contains not greater than 20 ppm chlorides. In another embodiment, the make-up water stream (630) may comprise water that contains not greater than 10 ppm chlorides. In one approach, the make-up water may be water treated via reverse osmosis. The use of such low-chloride water may reduce the build-up of residual chlorides in the system (1). For example, in one embodiment, the steady state chloride concentration in the scrubbing liquor (160) is not greater than 35,000 ppm. In another embodiment, the steady state chloride concentration in the scrubbing liquor (160) is not greater than 30,000 ppm. In yet another embodiment, the steady state chloride concentration in the scrubbing liquor (160) is not greater than 25,000 ppm. In another embodiment, the steady state chloride concentration in the scrubbing liquor (160) is not greater than 20,000 ppm. In yet another embodiment, the steady state chloride concentration in the scrubbing liquor (160) is not greater than 15,000 ppm. In another embodiment, the steady state chloride concentration in the scrubbing liquor (160) is not greater than 10,000 ppm. In yet another embodiment, the steady state chloride concentration in the scrubbing liquor (160) is not greater than 9,000 ppm. In another embodiment, the steady state chloride concentration in the scrubbing liquor (160) is not greater than 8,000 ppm.

In yet another embodiment, the steady state chloride concentration in the scrubbing liquor (160) is not greater than 7,000 ppm. In another embodiment, the steady state chloride concentration in the scrubbing liquor (160) is not greater than 6,000 ppm. In yet another embodiment, the steady state chloride concentration in the scrubbing liquor (160) is not greater than 5,000 ppm. In another embodiment, the steady state chloride concentration in the scrubbing liquor (160) is not greater than 4,000 ppm. In yet another embodiment, the steady state chloride concentration in the scrubbing liquor (160) is not greater than 3,000 ppm. In another embodiment, the steady state chloride concentration in the scrubbing liquor (160) is not greater than 2,000 ppm (e.g., to produce high quality gypsum in the wetcake material). As used herein, "chlorides" and the like means NaCl, KCl, CaCl2 and combinations thereof. As used herein, the "steady state chlorides concentration means" the average concentration of chlorides in the scrubbing liquor of a dilute mode dual alkali scrubber system after the system has been run continuously for a sufficient period of time such that the concentration of chlorides reaches an essentially constant level. Such low chloride levels in the scrubbing liquor may also facilitate low levels of chlorides in the wetcake material. For example, in one embodiment, the wetcake material contains not greater than 2.0 wt. % Cl (chlorine), where the Cl is in the form of chlorides. In another embodiment, the wetcake material contains not greater than 1.9 wt. % Cl, where the Cl is in the form of chlorides. In yet another embodiment, the wetcake material contains not greater than 1.8 wt. % Cl, where the Cl is in the form of chlorides. In another embodiment, the wetcake material contains not greater than 1.7 wt. % Cl, where the Cl is in the form of chlorides. In yet another embodiment, the wetcake material contains not greater than 1.6 wt. % Cl, where the Cl is in the form of chlorides. In another embodiment, the wetcake material contains not greater than 1.5 wt. % Cl, where the Cl is in the form of chlorides. In yet another embodiment, the wetcake material contains not greater than 1.4 wt. % Cl, where the Cl is in the form of chlorides. In another embodiment, the wetcake material contains not greater than 1.3 wt. % Cl, where the Cl is in the form of chlorides. In yet another embodiment, the wetcake material contains not greater than 1.2 wt. % Cl, where the Cl is in the form of chlorides. In another embodiment, the wetcake material contains not greater than 1.1 wt. % Cl, where the Cl is in the form of chlorides. In yet another embodiment, the wetcake material contains not greater than 1.0 wt. % Cl, where the Cl is in the form of chlorides. In another embodiment, the wetcake material contains not greater than 0.9 wt. % Cl, where the Cl is in the form of chlorides. In yet another embodiment, the wetcake material contains not greater than 0.8 wt. % Cl, where the Cl is in the form of chlorides. In another embodiment, the wetcake material contains not greater than 0.7 wt. % Cl, where the Cl is in the form of chlorides. In yet another embodiment, the wetcake material contains not greater than 0.6 wt. % Cl, where the Cl is in the form of chlorides. In another embodiment, the wetcake material contains not greater than 0.5 wt. % Cl, where the Cl is in the form of chlorides. In yet another embodiment, the wetcake material contains not greater than 0.4 wt. % Cl, where the Cl is in the form of chlorides. In another embodiment, the wetcake material contains not greater than 0.3 wt. % Cl, where the Cl is in the form of chlorides. In yet another embodiment, the wetcake material contains not greater than 0.2 wt. % Cl, where the Cl is in the form of chlorides. In another embodiment, the wetcake material contains not greater than 0.1 wt. % Cl, where the Cl is in the form of chlorides. In yet another embodiment, the wetcake material contains not greater than 0.08 wt. % Cl, where the Cl is in the form of chlorides. In another embodiment, the wetcake material contains not greater than 0.06 wt. % Cl, where the Cl is in the form of chlorides. In yet another embodiment, the wetcake material contains not greater than 0.04 wt. % Cl, where the Cl is in the form of chlorides. In another embodiment, the wetcake material contains not greater than 0.02 wt. % Cl, where the Cl is in the form of chlorides. In yet another embodiment, the wetcake material contains not greater than 0.017 wt. % Cl, where the Cl is in the form of chlorides (e.g., to produce high quality gypsum in the wetcake material).

Still referring to FIG. 7, the scrubber feed vessel (600) may include a level transmitter (602) to monitor the liquid level in the scrubber feed vessel (600). As described below, the level transmitter (602) may be useful in controlling the concentration of precipitated solids (324) in the scrubbing liquor (160). Referring back to FIG. 5, the seed crystal density meter (442) may monitor the density of the seed crystal slurry (450). A solids recycle density meter (452) may monitor the density of the solids recycle stream (450). A solids recycle control element (454) to may control the flow rate of the solids recycle stream (450) to the scrubber feed vessel (600). In one embodiment, the solids recycle control element is a valve (e.g., a modulating control valve, an "on/off" control valve, to name a few). In another embodiment, the solids recycle control element is a modulating pump. The solids recycle control element (454) may be employed to control the concentration of precipitated solids (324) in the scrubbing liquor (160) based on signals from at least one of the seed crystal density meter (442), the solids recycle density meter (452), and the level transmitter (602). For example, the density of the solids recycle stream (450), as monitored by the solids recycle density meter (452), may indicate the concentration of precipitated solids (324) in the solids recycle stream (450). Thus, based on the liquid level in scrubber feed vessel (600), as indicated by the level transmitter (602), the flow rate of solids recycle stream (450) may be adjusted in order to control the concentration of precipitated solids (324) in the scrubber feed vessel (600), and therefore in the regenerated scrubbing liquor (620). By controlling the concentration of precipitated solids (324) in the regenerated scrubbing liquor (620), the concentration of precipitated solids (324) in the scrubbing liquor (160) may also be controlled. In one approach, the flow rate of the solids recycle stream is adjusted such that the scrubbing liquor (160) includes from 0.1 to 5 wt. % of the precipitated solids (324). In one embodiment, the flow rate of the solids recycle stream is adjusted such that the scrubbing liquor (160) includes at least 0.2 wt. % of the precipitated solids (324). In another embodiment, the flow rate of the solids recycle stream is adjusted such that the scrubbing liquor (160) includes at least 0.3 wt. % of the precipitated solids (324). In yet another embodiment, the flow rate of the solids recycle stream is adjusted such that the scrubbing liquor (160) includes at least 0.4 wt. % of the precipitated solids (324). In another embodiment, the flow rate of the solids recycle stream is adjusted such that the scrubbing liquor (160) includes at least 0.5 wt. % of the precipitated solids (324). In yet another embodiment, the flow rate of the solids recycle stream is adjusted such that the scrubbing liquor (160) includes at least 0.6 wt. % of the precipitated solids (324). In another embodiment, the flow rate of the solids recycle stream is adjusted such that the scrubbing liquor (160) includes at least 0.7 wt. % of the precipitated solids (324). In another embodiment, the flow rate of the solids recycle stream is adjusted such that the scrubbing liquor (160) includes at least 0.8 wt. % of the precipitated solids (324). In yet another embodiment, the flow rate of the solids recycle stream is adjusted such that the scrubbing liquor (160) includes at least 0.9 wt. % of the precipitated solids (324). In another embodiment, the flow rate of the solids recycle stream is adjusted such that the scrubbing liquor (160) includes at least 1.0 wt. % of the precipitated solids (324). In yet another embodiment, the flow rate of the solids recycle stream is adjusted such that the scrubbing liquor (160) includes not greater than 4 wt. % of the precipitated solids (324). In another embodiment, the flow rate of the solids recycle stream is adjusted such that the scrubbing liquor (160) includes not greater than 3.5 wt. % of the precipitated solids (324). In yet another embodiment, the flow rate of the solids recycle stream is adjusted such that the scrubbing liquor (160) includes not greater than 3 wt. % of the precipitated solids (324). In another embodiment, the flow rate of the solids recycle stream is adjusted such that the scrubbing liquor (160) includes not greater than 2.5 wt. % of the precipitated solids (324). In yet another embodiment, the flow rate of the solids recycle stream is adjusted such that the scrubbing liquor (160) includes not greater than 2 wt. % of the precipitated solids (324).

As described above, precipitated solids (324) included in the scrubbing liquor (160) may facilitate increased $SO_2$ removal efficiency from the gas stream (110). The recirculation of precipitated solids (324) throughout the system (1) may also retard and/or prevent "scaling" (i.e., precipitation of solids) on the wetted surfaces of vessels and piping thereof. For example, precipitated solids suspended in a liquid contained within a vessel may provide sites for solid crystal formation, thereby preventing and/or retarding the formation of solids on the wetted surfaces of the vessel. In this regard the recycle vessel (200), reaction vessel (300), thickener (400), and/or scrubber feed vessel (600) may be equipped with one or more agitators and or baffles to maintain the precipitated solids in suspension.

These and other aspects and advantages, and novel features of this new technology are set forth in part in the description that follows and will become apparent to those skilled in the art upon examination of the following description and figures, or may be learned by practicing one or more embodiments of the technology provided for by the present disclosure.

BRIEF DESCRIPTION OF THE DRAWINGS

FIG. 8 is chart illustrating data of Example 1.

DETAILED DESCRIPTION

Example 1

Evaluation of Oxidation Catalyst

Oxidation testing was performed in a batch reactor using air sparging. For each oxidation catalyst test run, a scrubbing liquor comprising sulfite ions (Total Oxidizeable Sulfur (TOS)), water, and an oxidation catalyst was introduced into the reactor. Comparison tests were run in a similar manner using scrubbing liquor free of oxidation catalyst. For each test run, the oxidation rate was measured at various TOS concentrations. Test runs were performed using iron ($FeSO_4.7H_2O$) and manganese (added as $KMnO_4$) as the oxidation catalyst. FIG. 8 illustrates the oxidation rates achieved by each of the oxidation catalysts. As illustrated, the scrubbing liquors containing oxidation catalysts achieved higher oxidation rates than the scrubbing liquor free of oxidation catalyst. Furthermore, the combination of about 1.1 ppm Mn and about 5 ppm Fe as the oxidation catalyst achieved oxidation rates more than twice as high as Mn or Fe used alone.

Example 2

System for Removing Sulfur Dioxide from a Gas Stream

Figure 1:
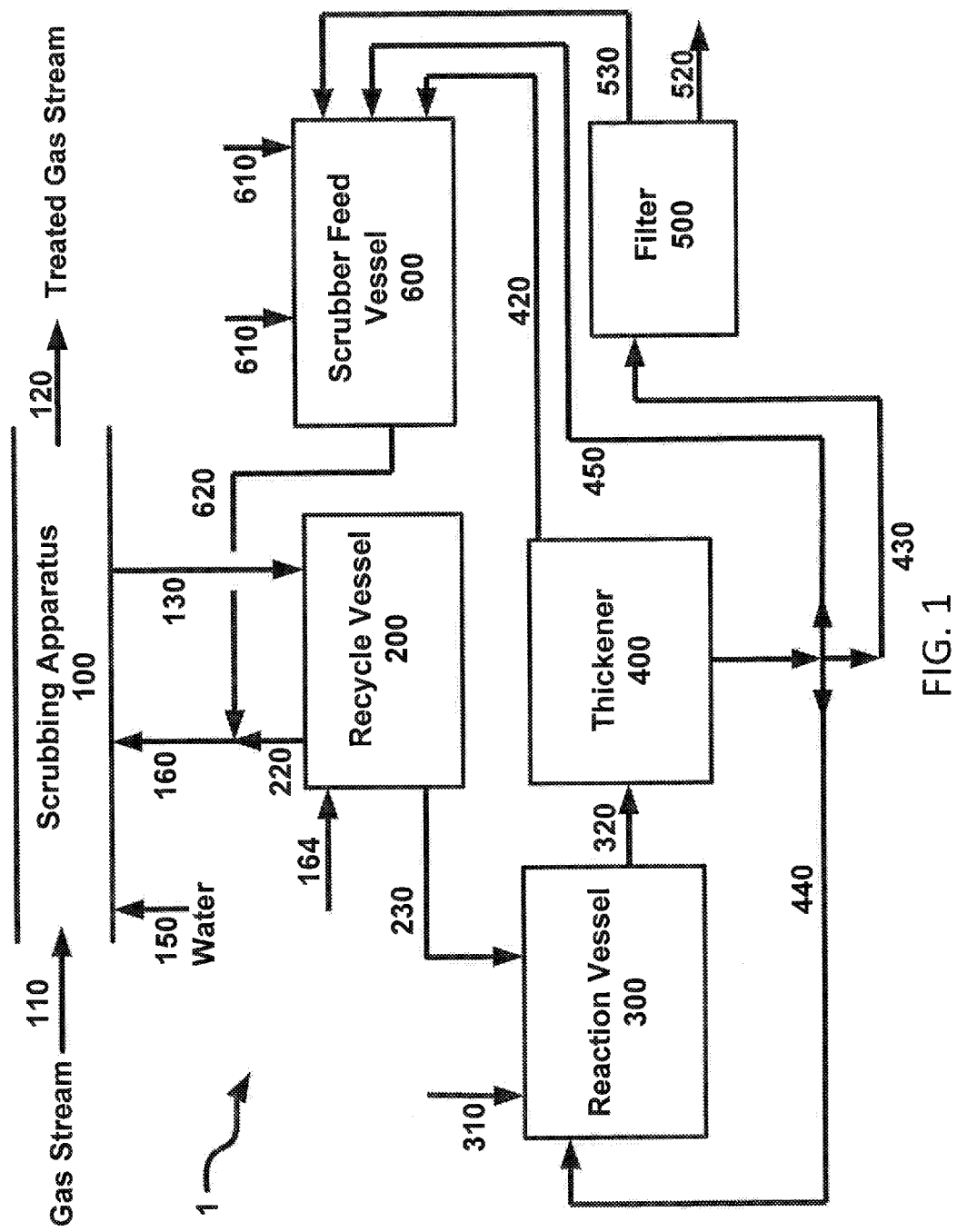
FIG. 1 is a schematic view of one embodiment of a system for removing sulfur dioxide from a gas stream.
Figure 2:
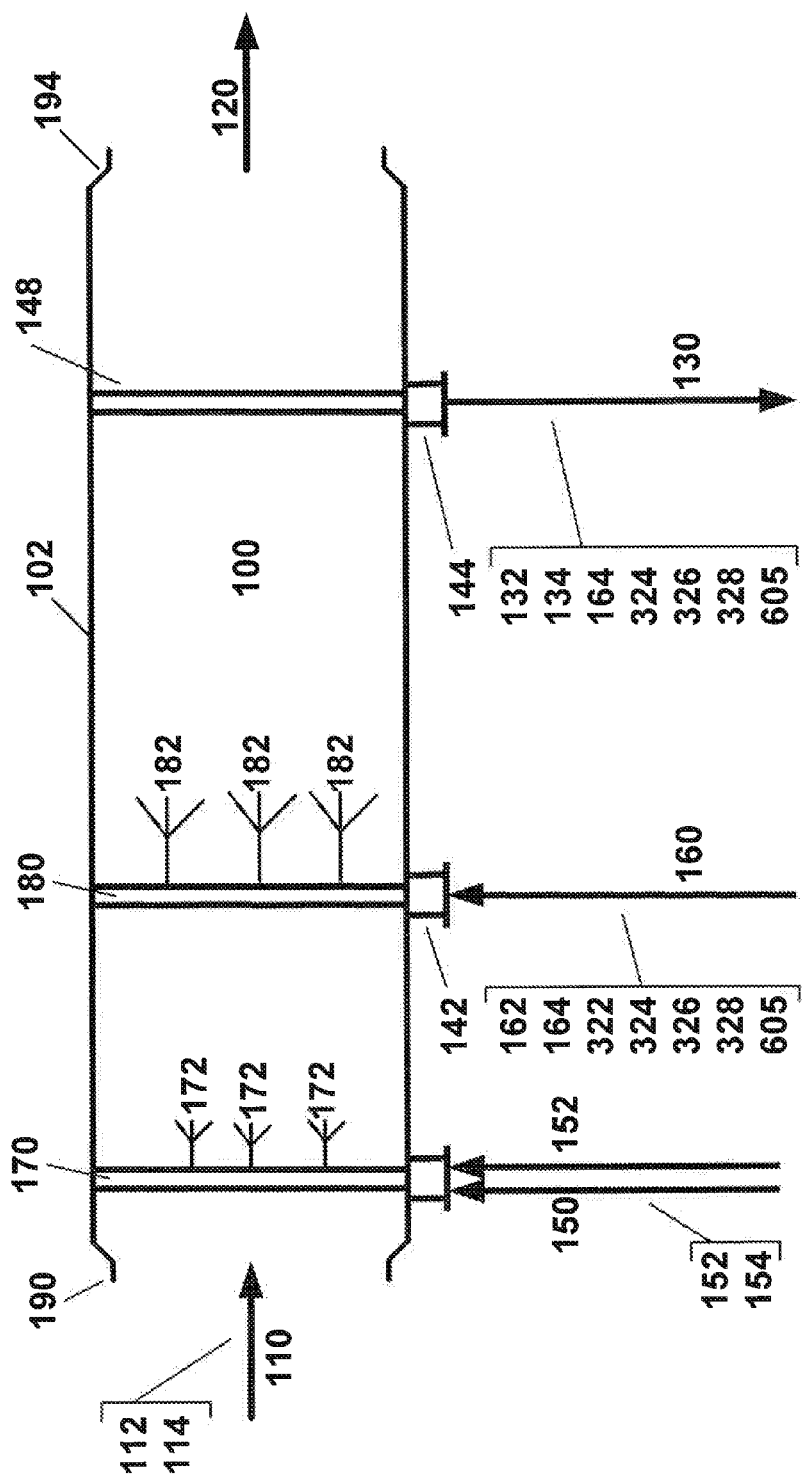
FIG. 2 is a schematic view of one embodiment of a scrubbing apparatus.
Figure 3:
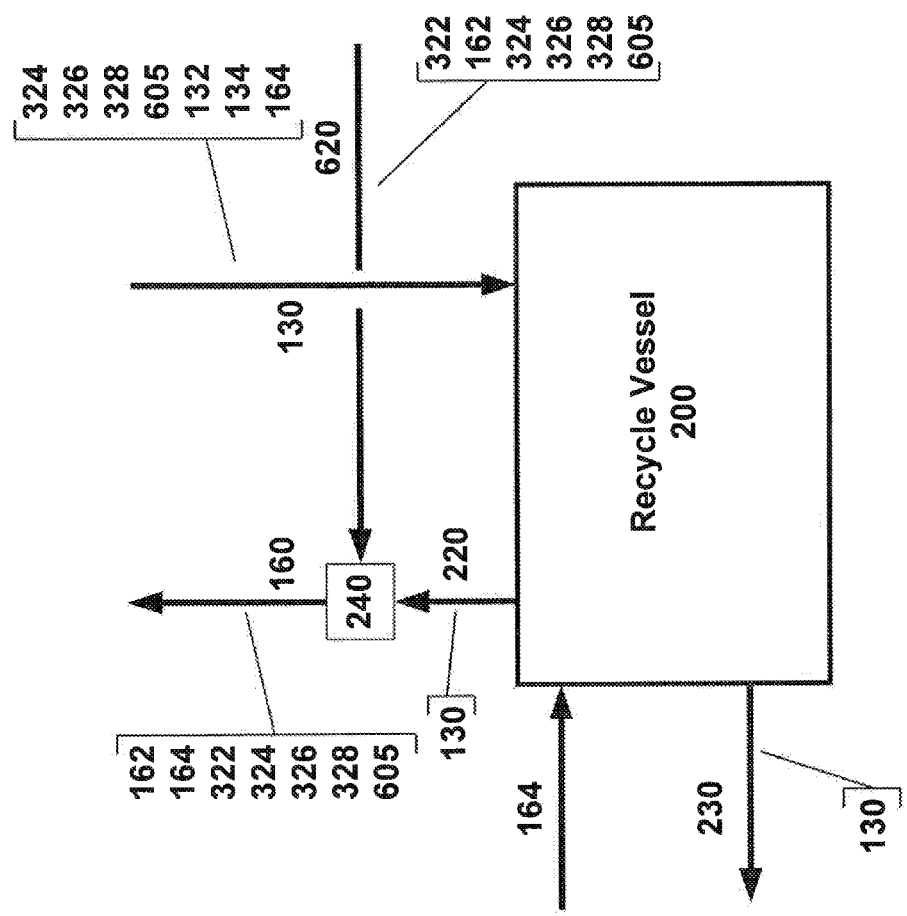
FIG. 3 is a schematic view of one embodiment of a recycle vessel.
Figure 4:
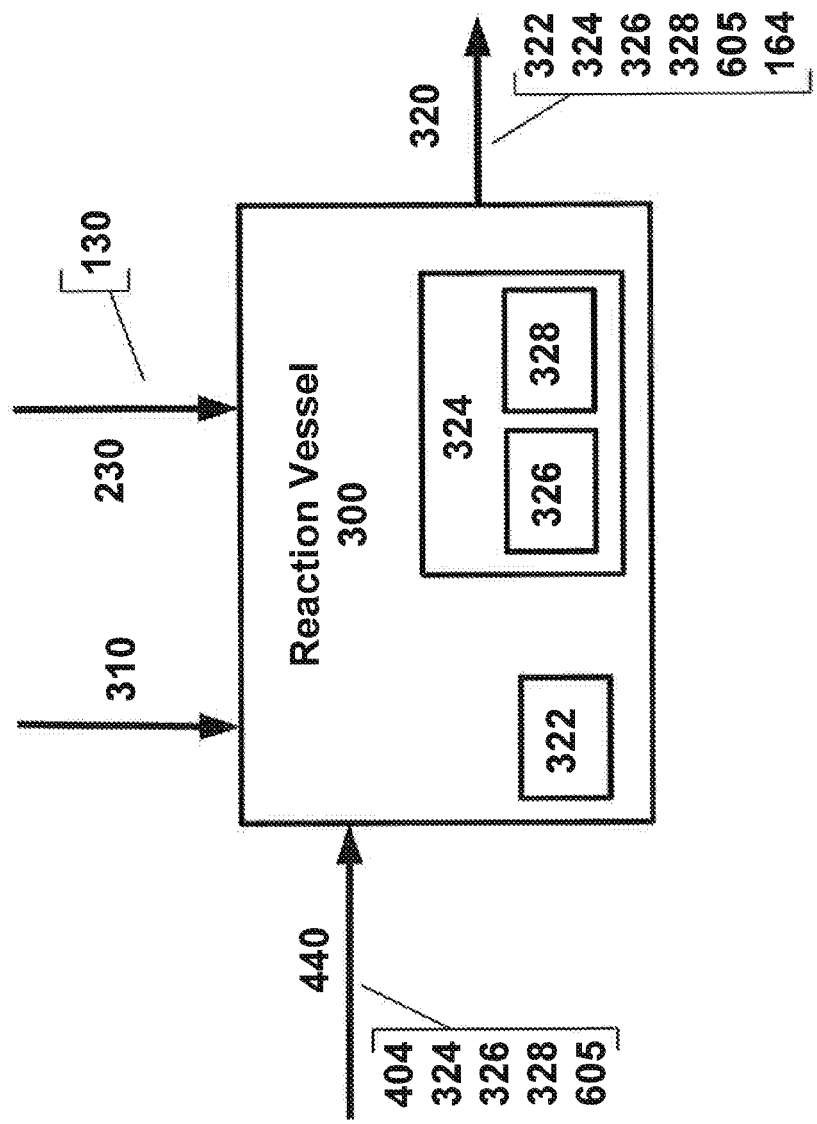
FIG. 4 is a schematic view of one embodiment of a reaction vessel.
Figure 5:
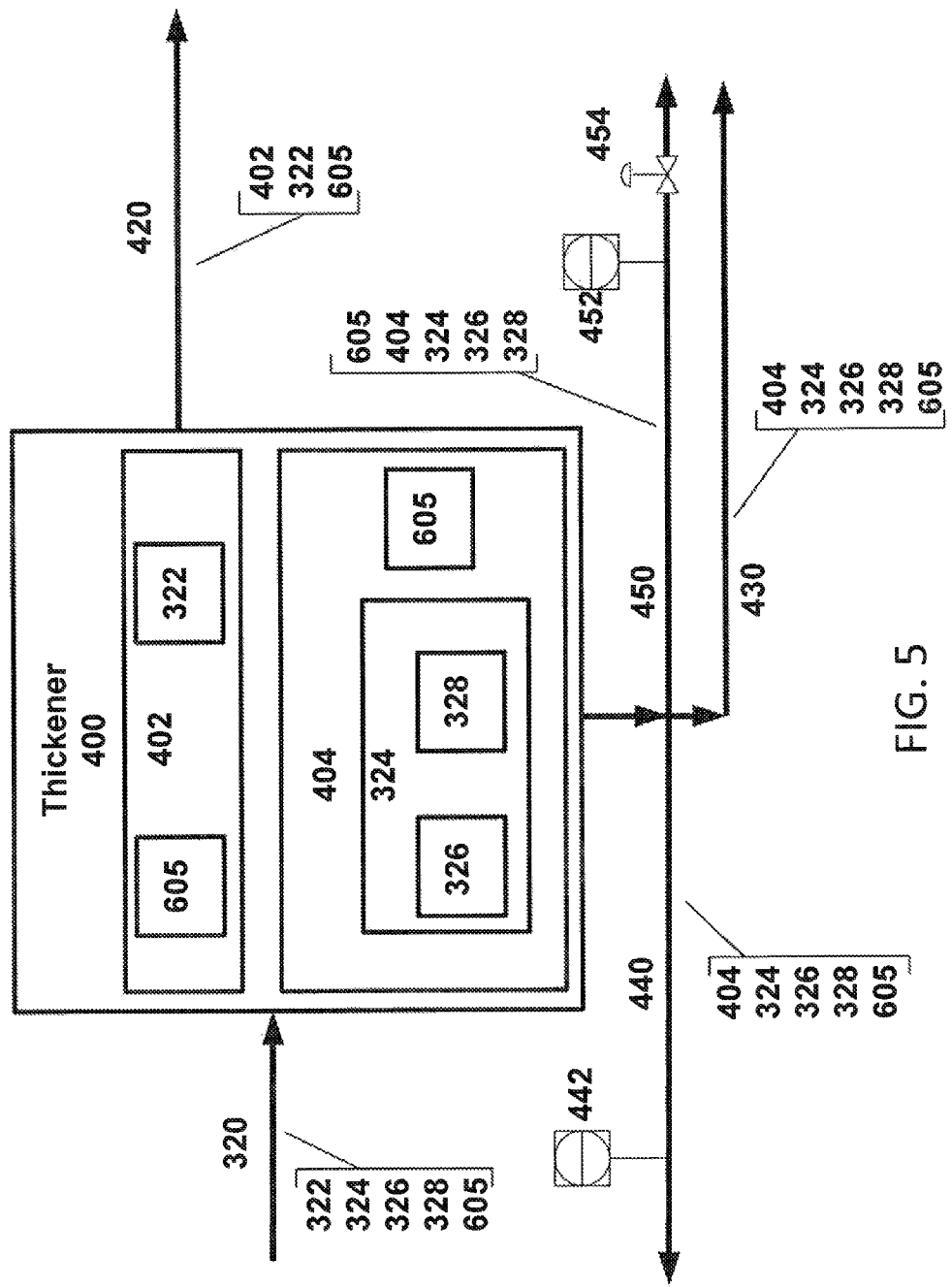
FIG. 5 is a schematic view of one embodiment of a thickener.
Figure 6:
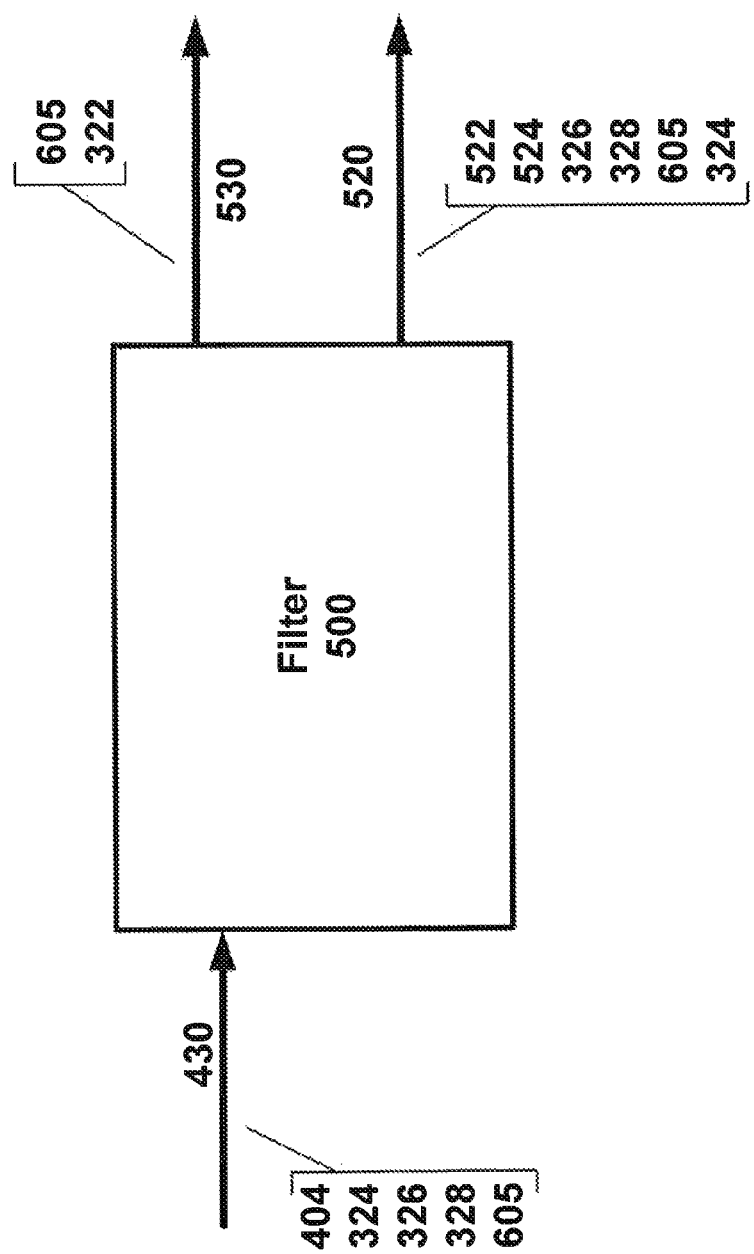
FIG. 6 is a schematic view of one embodiment of a filter.
Figure 7:
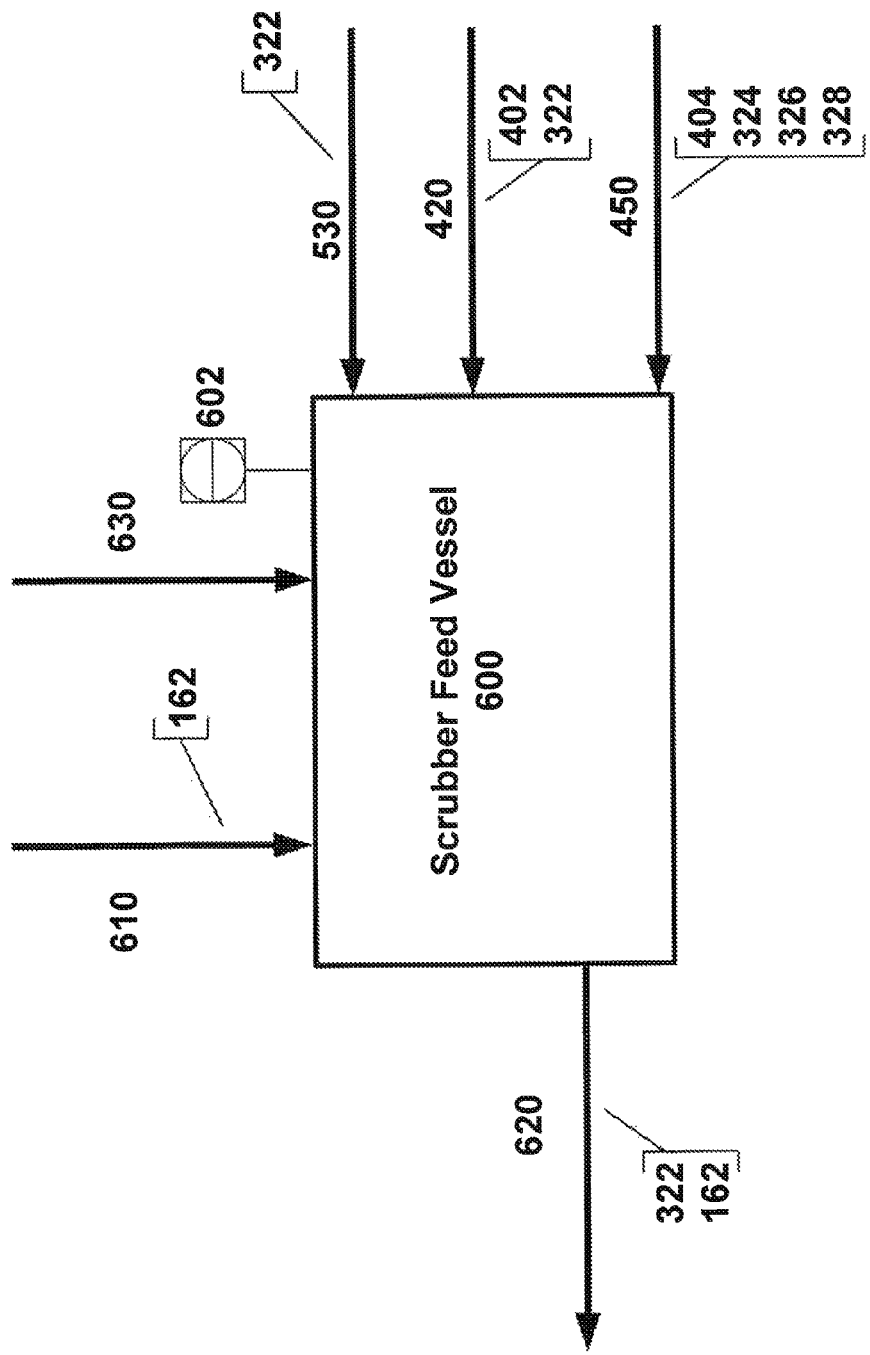
FIG. 7 is a schematic view of one embodiment of a scrubber feed vessel.

A system for removing sulfur dioxide from a gas stream similar to the one illustrated in FIGS. 1-7 was produced. The various streams of the system were flowed. Oxidation catalyst in the form of $FeSO_4.7H_2O$ was supplied to the recycle vessel at a rate of about 280 grams/hour. About 42 kg/h of sulfur dioxide entered the scrubbing apparatus in the gas stream and about 4 kg/h of sulfur dioxide exited the scrubbing apparatus in the treated gas stream. The system removed more than about 90 wt. % of the sulfur dioxide from the gas stream. A lime utilization efficiency of more than about 95% was achieved. A solid gypsum to solid calcium hydroxide ratio of at least about 24:1 was achieved in the wetcake material. Approximately 99 kg/h (kilograms per hour) of solid gypsum was produced.

While various embodiments of the new technology described herein have been described in detail, it is apparent that modifications and adaptations of those embodiments will occur to those skilled in the art. However, it is to be expressly understood that such modifications and adaptations are within the spirit and scope of the presently disclosed technology.

What is claimed is:

1. A method comprising:
   (a) passing a gas stream (110) comprising $SO_2$ (112) through a gas scrubbing apparatus (100);
   wherein, prior to the passing step, the $SO_2$ concentration in the gas stream is from 1 to 400 ppm;
   (b) first flowing a scrubbing liquor (160) comprising hydroxide ions (162), and at least one oxidation catalyst (164) through a liquid inlet (142) of the gas scrubbing apparatus;
   wherein, during the flowing, the scrubbing liquor (160) comprises at least 5 ppm of the oxidation catalyst;
   (c) contacting, in the scrubbing apparatus, the gas stream (110) with the scrubbing liquor (160);

(d) removing, in response to the contacting step, at least 90 wt. % of the $SO_2$ from the gas stream, thereby creating a treated gas stream (120);
(e) concomitant to the contacting step:
  (i) reacting at least some of the $SO_2$ with at least some of the hydroxide ions thereby forming sulfite ions (132) in the scrubbing liquor;
  (ii) oxidizing some of the sulfite ions via the oxidation catalyst thereby forming sulfate ions (134) in the scrubbing liquor;
(f) second flowing a used scrubbing liquor (130) comprising at least some of the sulfite ions (132) and at least some of the sulfate ions (134) through a liquid outlet (144) of the scrubbing apparatus (100).

2. The method of claim 1, wherein during the second flowing step the sulfate ions (134) and the sulfite ions (132) are present in the used scrubbing liquor (130) in a ratio of at least 19:1 (sulfate ions:sulfite ions).

3. The method of claim 1, comprising:
prior to the first flowing step, adding at least some of the at least one oxidation catalyst (164) to the scrubbing liquor (160);
  wherein, after the adding step, the scrubbing liquor (160) contains the at least 5 ppm of the at least one oxidation catalyst (164).

4. The method of claim 1, comprising:
directing the used scrubbing liquor (130) from the liquid outlet (144) of the scrubbing apparatus to a recycle vessel (200).

5. The method of claim 4, comprising:
recycling at least a portion of the used scrubbing liquor (130) from the recycle vessel (200) through the liquid inlet (142) of the gas scrubbing apparatus.

6. The method of claim 5, comprising
prior to the first flowing step, adding at least some of the at least one oxidation catalyst (164) into the recycle vessel (200);
  wherein, after the adding step, the scrubbing liquor (160) contains the at least 5 ppm of the at least one oxidation catalyst (164).

7. The method of claim 4, comprising:
discharging a recycle effluent (230) from the recycle vessel (200) to a reaction vessel (300);
  wherein the recycle effluent (230) comprises at least some of the used scrubbing liquor (130).

8. The method of claim 7, comprising:
expelling a recycled scrubbing liquor (220) from the recycle vessel to a mixing zone (240).

9. The method of claim 8, wherein the contacting step is a first contacting step, the method comprising:
second contacting, in the reaction vessel (300), the recycle effluent (230) with lime (310) comprising at least one of $CaCO_3$, $Ca(OH)_2$, and CaO;
concomitant to the second contacting step, reacting in the reaction vessel (300), some of the sulfite ions (132) and some of the sulfate ions (134) of the recycle effluent (230) with the at least one of $CaCO_3$, $Ca(OH)_2$, and CaO, thereby forming regenerated hydroxide ions (322) and precipitated solids (324);
  wherein the precipitated solids (324) comprises at least 85 wt. % solid gypsum particles (326).

10. The method of claim 9, comprising:
conveying a reaction slurry (320) from the reaction vessel (300) to a thickener (400);
  wherein the reaction slurry (320) comprises at least some of the at least some of the precipitated solids (324); and
  wherein the reaction slurry has a first concentration of regenerated hydroxide ions (322).

11. The method of claim 10, comprising:
settling, in the thickener (400), at least some of the precipitated solids (324) from the reaction slurry (320), thereby forming a liquid-rich layer (402) above a solids-rich layer (404);
  wherein the liquid-rich layer (402) has second concentration of regenerated hydroxide ions (322);
  wherein the second concentration of regenerated hydroxide ions (322) is greater than the first; and
  wherein the solids-rich layer (404) comprises at least some of the precipitated solids (324).

12. The method of claim 11, comprising:
decanting a thickener effluent (420) from the thickener (400) to a scrubber feed vessel (600);
  wherein the thickener effluent (420) comprises at least some of the liquid-rich layer (402).

13. The method of claim 12, comprising:
moving a filter feed slurry (430) from the thickener (400) to a filter (500);
  wherein the filter feed slurry (430) comprises at least some of the solids-rich layer (404).

14. The method of claim 13, comprising:
transferring a seed crystal slurry (440) from the thickener (400) to the reaction vessel (300);
  wherein the seed crystal slurry (440) comprises at least some of the solids-rich layer (404).

15. The method of claim 14, comprising:
feeding, at a preselected feed rate, a solids recycle stream (450) from the thickener (400) to the scrubber feed vessel (600);
  wherein the solids recycle stream (450) comprises at least some of the solids-rich layer (404).

16. The method of claim 15, comprising
filtering, in the filter (500), the filter feed slurry (430), thereby forming a filter effluent (530) and a wetcake material (520);
  wherein the filter effluent (530) comprises at least some of the regenerated hydroxide ions (322);
  wherein the wetcake material (520) comprises a solids portion (522) and a liquid portion (524);
  wherein the solids portion comprises at least some of the precipitated solids (324);
and
  wherein the solids portion is at least 85 wt. % solid gypsum particles (326).

17. The method of claim 16, comprising:
delivering the filter effluent (530) from the filter (500) to the scrubber feed vessel (600).

18. The method of claim 17, comprising:
ejecting a regenerated scrubbing liquor (620) from the scrubber feed vessel (600) to the mixing zone (240);
  wherein the regenerated scrubbing liquor (620) comprises at least some of the filter effluent (530) and at least some of the thickener effluent (420).

19. The method of claim 18, comprising:
mixing, in the mixing zone (240), the regenerated scrubbing liquor (620) with the recycled scrubbing liquor (220), thereby forming the scrubbing liquor (160).

20. The method of claim 19, comprising:
adjusting the flow rate of the solids recycle stream (450) to the scrubber feed vessel (600) such that the scrubbing liquor (160) comprises from 0.1 to 5 wt. % of the precipitated solids (324).

* * * * *